(12) United States Patent
Von Wilcke et al.

(10) Patent No.: US 11,652,342 B2
(45) Date of Patent: May 16, 2023

(54) DEVICE FOR ELECTRIFYING FURNITURE

(71) Applicant: Häfele Berlin GmbH & Co KG, Berlin (DE)

(72) Inventors: Michael Von Wilcke, Birkenwerder (DE); Robert Birkner, Berlin (DE)

(73) Assignee: Häfele Berlin GmbH & Co KG, Berlin (DE)

( * ) Notice: Subject to any disclaimer, the term of this patent is extended or adjusted under 35 U.S.C. 154(b) by 0 days.

(21) Appl. No.: 17/659,557

(22) Filed: Apr. 18, 2022

(65) Prior Publication Data

US 2022/0239087 A1 Jul. 28, 2022

Related U.S. Application Data

(63) Continuation of application No. PCT/EP2020/077341, filed on Sep. 30, 2020.

(30) Foreign Application Priority Data

Nov. 6, 2019 (DE) ............ 20 2019 106 156.1

(51) Int. Cl.
*H01R 31/06* (2006.01)
*H02G 5/02* (2006.01)
*H02G 5/04* (2006.01)

(52) U.S. Cl.
CPC ............ *H02G 5/025* (2013.01); *H01R 31/06* (2013.01); *H02G 5/04* (2013.01)

(58) Field of Classification Search
CPC ........ H01R 33/02; H01R 31/06; H02G 5/025; H02G 5/04

See application file for complete search history.

(56) References Cited

U.S. PATENT DOCUMENTS

| 2,274,136 A | * | 2/1942 | Frank | H01R 25/142 439/118 |
| 4,032,208 A | * | 6/1977 | Berkenhoff | H01R 25/142 439/122 |
| 4,190,309 A | * | 2/1980 | Glass | H01R 25/142 439/118 |
| 4,689,726 A | * | 8/1987 | Kretzschmar | F21S 4/20 362/127 |
| 4,795,355 A | * | 1/1989 | Dorn | H02G 5/04 439/115 |

(Continued)

FOREIGN PATENT DOCUMENTS

DE  20 2008 003 360 U1  6/2008
DE  10 2009 011 449 A1  9/2010

(Continued)

*Primary Examiner* — Thanh Tam T Le
(74) *Attorney, Agent, or Firm* — Orbit IP

(57) ABSTRACT

A device for the electrification of furniture includes at least a first furniture panel, which has, in one of its two panel sides, two parallel grooves and two exposed busbars laid respectively in the two grooves and at least one electric plug for connecting to the two busbars. The plug has two electrical contacts, which are formed as exposed collector contacts on a connecting side of the plug housing and as connection contacts on a front side of the plug housing. The plug is inserted into a bore, interrupting the two grooves, in the one panel side of the first furniture panel. The collector contacts each lie against the two busbars in an electrically conductive manner.

16 Claims, 2 Drawing Sheets

(56) References Cited

U.S. PATENT DOCUMENTS

| | | | | |
|---|---|---|---|---|
| 5,759,051 | A | * | 6/1998 | Cancellieri .......... H01R 25/142 439/118 |
| 6,290,516 | B1 | * | 9/2001 | Gerber .................. H01R 25/14 439/94 |
| 7,188,805 | B2 | * | 3/2007 | Henley .................. H01R 25/14 244/118.5 |
| 9,608,392 | B1 | * | 3/2017 | Destro ................. H01R 25/142 |
| 10,084,275 | B1 | * | 9/2018 | Hall ........................ H01R 33/92 |
| 10,272,803 | B2 | * | 4/2019 | Chae ...................... B60N 2/236 |
| 10,527,272 | B2 | * | 1/2020 | Layne .................... F21V 21/35 |
| 2010/0008072 | A1 | | 1/2010 | Meier-Graichen et al. |

FOREIGN PATENT DOCUMENTS

| | | |
|---|---|---|
| DE | 20 2010 011 638 U1 | 3/2011 |
| DE | 20 2010 013 220 U1 | 4/2012 |
| DE | 20 2013 105 066 U1 | 1/2014 |
| DE | 20 2014 002 269 U1 | 4/2014 |
| DE | 20 2017 104 106 U1 | 8/2017 |
| WO | 2012/022445 A1 | 2/2012 |
| WO | 2013/013692 A1 | 1/2013 |

* cited by examiner

DEVICE FOR ELECTRIFYING FURNITURE

CROSS-REFERENCE TO RELATED APPLICATIONS

This continuation application claims priority to PCT/EP2020/077341 filed on Sep. 30, 2020 which has published as WO 2021/089247 A1 and also the German application number 20 2019 106 156.1 filed on Nov. 6, 2019, the entire contents of which are fully incorporated herein with these references.

DESCRIPTION

Field of the Invention

The invention relates to a device for the electrification of furniture.

Background of the Invention

For the electrification of furniture, cables are typically used which have to be laboriously threaded into furniture panels through holes on site.

In contrast, the present invention is based on the object of providing alternative electrification of furniture.

SUMMARY OF THE INVENTION

This object is achieved according to the invention by a device for the electrification of furniture comprising at least a first furniture panel, which has, in one of its two panel sides, two parallel grooves and two exposed busbars laid respectively in the two grooves, and comprising at least one electric plug for connecting to the two busbars, which plug has two electrical contacts, which are formed as exposed collector contacts on a connecting side of the plug housing and as connection contacts on a front side of the plug housing, wherein the plug is inserted either into a bore, interrupting the two grooves, in the one panel side of the first furniture panel or into a laterally open bore in one of the two panel sides of a second furniture panel, which lies against the first furniture panel with its end face having the open bore side, and wherein the collector contacts each lie against the two busbars in an electrically conductive manner.

Advantageous developments of the invention are indicated in the subclaims.

The inventive device for the electrification of furniture has, in particular, the following advantages:
an invisible electrical distribution in the furniture with variable contacting for different current collection plugs;
the current collection plugs can be positioned variably along the busbars according to customer requirements;
the busbars are designed such that, on the one hand, they are resiliently mounted and, on the other, become clawed in the grooves of the furniture panel as they are incorporated therein owing to the corresponding structural design.

In the second furniture panel seated on the busbars of a first furniture panel at the end face, the collector contacts of the plug of the second furniture panel come into electrical contact with the busbars via a laterally open edge bore.

Further advantages of the invention are revealed in the description, the claims and the drawing. Likewise, the features mentioned above and those yet to be described below can be used individually or collectively in any desired combination. The embodiments shown and described are not to be understood as an exclusive list, but rather have an exemplary character for presenting the invention.

DETAILED DESCRIPTION OF THE PREFERRED EMBODIMENTS

Figure 1:
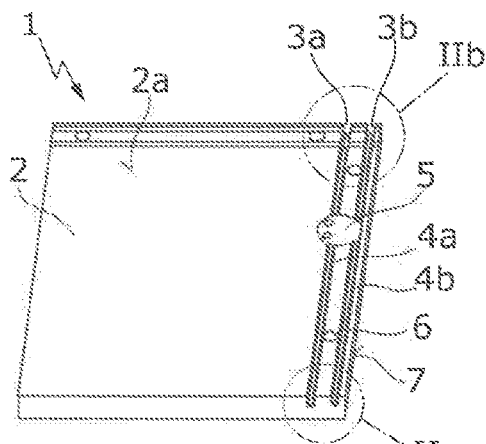
FIG. 1 shows a first device for the electrification of a furniture panel.

The device 1 shown in FIG. 1 serves for the electrification of furniture and comprises a furniture panel 2, which has, in the upper panel side 2a here, two parallel grooves 3a, 3b and two exposed busbars 4a, 4b laid therein, and a plug 5 for electrically connecting to the two busbars 4a, 4b. Fastening bores 6 for fastening the furniture panel 1 are arranged centrally between the two grooves 3a, 3b.

Figures 2A, 2B:
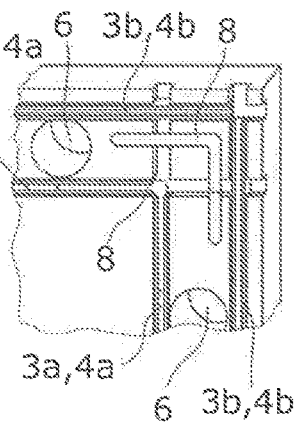
FIGS. 2a, 2b show detailed views of the furniture panel according to IIa and IIb in FIG. 1.

As shown in FIG. 2a, the two grooves 3a, 3b extend parallel to, and directly along, the panel end face 7 of the first furniture panel 2. The busbars 4a, 4b are each formed as a U-shaped rail profile, whereof the profile opening faces towards the upper panel side 2a, and are clamped and clawed in the grooves 3a, 3b. The free profile ends of the U-shaped rail profile are spaced from the groove walls and are thus mounted to be outwardly resilient. The U-shaped rail profiles are therefore designed such that, on the one hand, they are resiliently mounted and, on the other, become clawed in the grooves 3a, 3b as they are incorporated therein owing to the structural design.

As shown in FIG. 2b, the furniture panel 2 can also have mutually angled pairs of parallel grooves 3a, 3b which lead into one another. The busbars 4a, 4b of grooves leading into one another are each connected to one another in an electrically conductive manner by means of an electrically conductive connecting element 8 (e.g., a metal angle bracket), which is inserted into the profile openings of the busbars 4a, 4b.

Figure 3A:
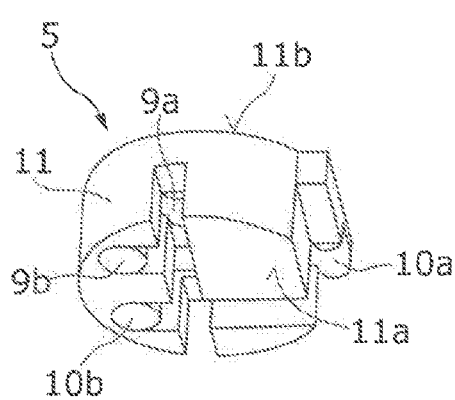
FIGS. 3a, 3b show a plug, shown in FIG. 1, in a perspective view looking onto its connecting side (FIG. 3a) and onto its front side (FIG. 3b)
Figure 3B:
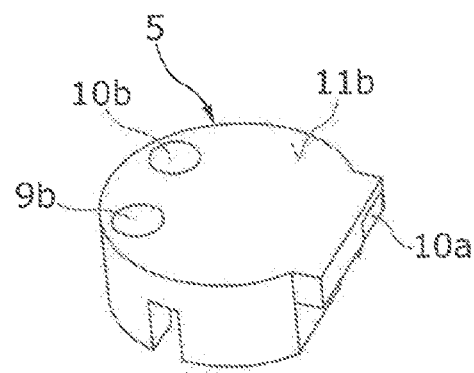

The plug 5 has two electrical contacts 9, 10 (FIGS. 3a, 3b, 5), which are formed as exposed collector contacts 9a, 10a on a connecting side 11a of the plug housing 11 and as connection contacts 9b, 10b on a front side 11b of the plug housing 11. The connecting side 11a and the front side 11b lie opposite one another.

Figure 4A:
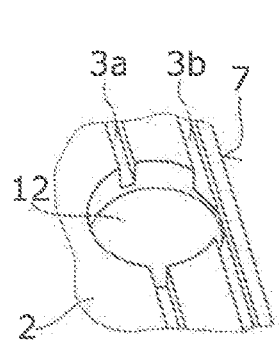
FIGS. 4a, 4b show the assembly of the plug in the furniture panel.
Figure 4B:
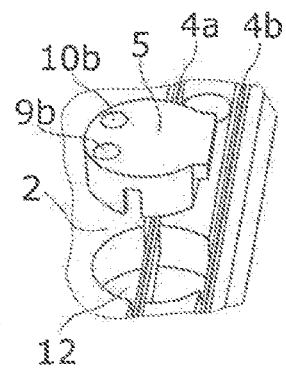
Figure 5:
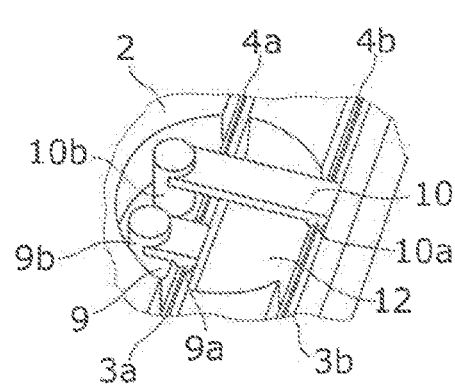
FIG. 5 shows the electrical contacting between the plug and busbars of the furniture panel.

FIGS. 4a, 4b show the assembly of the plug 5 in the furniture panel 2. The plug 5 is inserted into a bore 12, interrupting the two grooves 3a, 3b, in the upper panel side 2a of the first furniture panel 2 until the collector contacts 9a, 10a lie against the two busbars 4a, 4b in an electrically conductive manner (FIG. 5). The bore 12 is arranged eccentrically with respect to the two grooves 3a, 3b, wherein the outer groove 3b is merely at a tangent to the bore 12 with its outer groove side wall. The bore 12 can be positioned variably along the grooves 3a, 3b or busbars 4a, 4b according to customer requirements. The plug 5 closes the bore 12 entirely and terminates flush with the upper panel side 2a. The resilient free profile ends of the U-shaped rail profile are spread apart elastically by the collector contacts 9a, 10a, which results in a greater contact pressure. To this end, the collector contacts 9a, 10a preferably have a contact end reaching between the free profile ends of the U-shaped rail profile, which contact end can be configured in the form of a partial cylinder, in the form of a spherical cap, conically, in the form of a wedge or as a round or flat pin, etc. The plug 5 is covered by a seated, second furniture panel 22, except for the connection contacts 9b, 10b.

Figure 6:
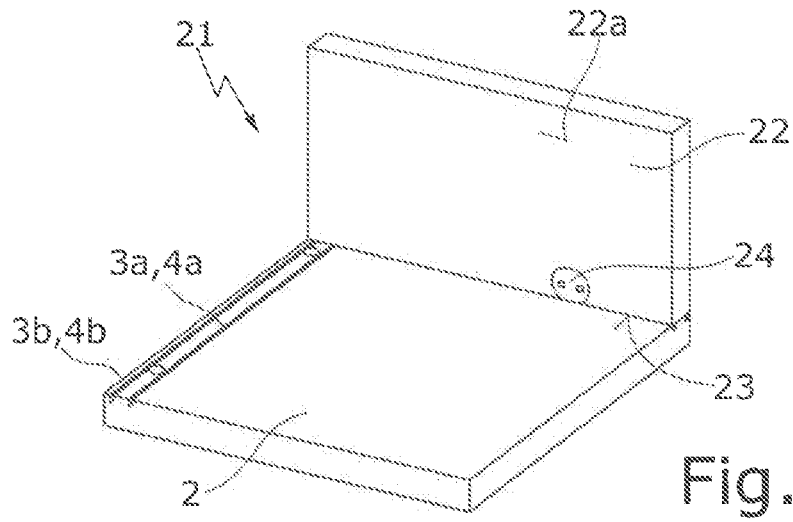
FIG. 6 shows a second device for the electrification of two furniture panels.

A second device 21 for the electrification of two furniture panels 2, 22 is shown in FIG. 6. As in FIG. 1, the first furniture panel 2 has two parallel grooves 3a, 3b and two busbars 4a, 4b laid therein. The second furniture panel 22 lies against the upper panel side 2a of the first furniture panel 1 with its end face 23 and is fastened to the first furniture panel 2 via connecting means (not shown), which are anchored in the fastening bores 6 of the first furniture panel 2. The fastening bore 6 can be, for example, a blind hole for a dowel or connector stud; alternatively, the connection can also be configured without fastening bores, e.g., using angle brackets or Lamello connectors. The second furniture panel 22 covers the grooves 3a, 3b so that the busbars 4a, 4b are not visible from the outside. A plug 24 for electrically connecting to the two busbars 4a, 4b of the first furniture panel 2 is inserted into a bore 25 in the front panel side 22a here of the second furniture panel 22, which bore is open towards the end face 23.

Figure 7A:
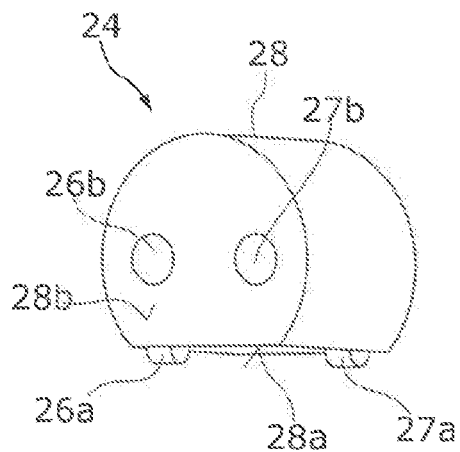
FIGS. 7a, 7b shows a plug, shown in FIG. 6, in a perspective view looking onto its connecting side (FIG. 7a) and onto its front side (FIG. 7b)
Figure 7B:
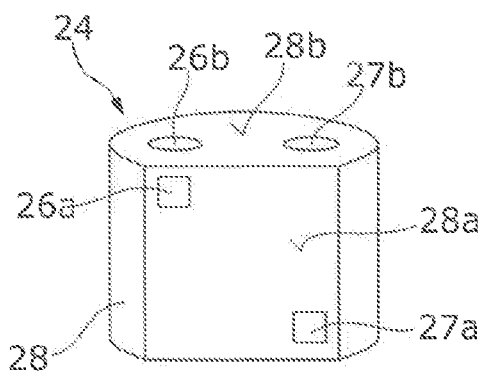
Figure 8A:
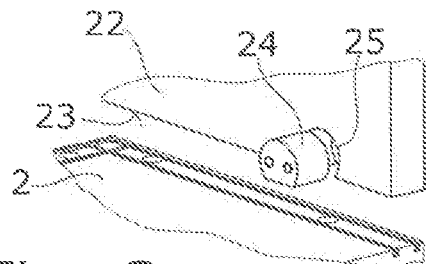
FIGS. 8a, 8b shows the assembly of the plug in the second furniture panel.
Figure 8B:
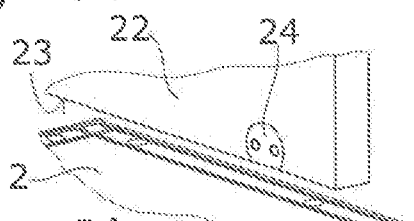
Figure 9:
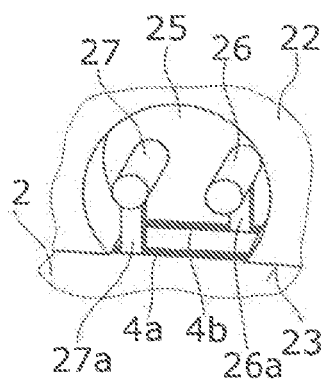
FIG. 9 shows the electrical contacting between the plug and the busbars of the first furniture panel.

As shown in FIGS. 7a, 7b, 9, the plug 24 has two electrical contacts 26, 27, which are formed as exposed collector contacts 26a, 27a on a connecting side 28a of the plug housing 28 and as partially cylindrical connection contacts 26b, 27b on a front side 28b of the plug housing 28. The connecting side 11a and the front side 11b are aligned at a right angle to one another. The plug 24 closes the bore 25 entirely and terminates flush with the front panel side 22a. When seating the second furniture panel 22 on the first furniture panel 2, the collector contacts 26a, 27a come into electrically conductive contact with the busbars 4a, 4b of the first furniture panel 2. The resilient free profile ends of the U-shaped rail profile are spread apart elastically by the collector contacts 26a, 27a, which results in a greater contact pressure.

What is claimed is:

1. A device for the electrification of furniture, comprising:
    at least a first furniture panel, which has two panel sides being a first panel side opposite a second panel side, wherein in the first panel side, two parallel grooves are formed into the first panel side being open to the first panel side and do not penetrate through to the second panel side, and two exposed busbars are laid respectively in the two parallel grooves; and
    at least one electric plug configured for connecting to the two exposed busbars, wherein the plug has two electrical contacts, which are formed as exposed collector contacts on a connecting side of a plug housing and as connection contacts on a front side of the plug housing; wherein the plug is inserted into a bore, wherein the bore is formed into the first panel side being open to the first panel side and does not penetrate through to the second panel side, the bore interrupting the two parallel grooves;
    wherein the bore present in the first furniture panel is arranged eccentrically with respect to the two parallel grooves; and
    wherein the exposed collector contacts each lie against the two exposed busbars in an electrically conductive manner;
    wherein the plug inserted into the first furniture panel is covered by a seated, second furniture panel, except for the connection contacts.

2. The device as claimed in claim 1, wherein the two parallel grooves extend parallel to a panel end face of the first furniture panel.

3. The device as claimed in claim 1, wherein the two exposed busbars are clamped in the two parallel grooves.

4. The device as claimed in claim 1, wherein the two exposed busbars are each formed as a U-shaped rail profile having two free profile ends and a profile opening, the profile opening facing towards the first panel side.

5. The device as claimed in claim 4, wherein the two free profile ends of the U-shaped rail profile are spaced from a groove walls of the two parallel grooves.

6. The device as claimed in claim 4, wherein the exposed collector contacts have a contact end reaching between the two free profile ends of the U-shaped rail profile.

7. The device as claimed in claim 1, wherein the bore is closed entirely by the plug.

8. The device as claimed in claim 7, wherein the bore terminates flush with the first panel side.

9. The device as claimed in claim 1, wherein one of the two parallel grooves is merely at a tangent to the bore present in the first furniture panel with an outer groove side wall.

10. The device as claimed in claim 1, wherein the connecting side and the front side of the plug for the first furniture panel lie opposite one another.

11. The device as claimed in claim 1, wherein the connecting side and the front side of the plug for the first furniture panel are aligned at a right angle to one another.

12. The device as claimed in claim 1, wherein at least one fastening bore of the first furniture panel is arranged between the two parallel grooves.

13. The device as claimed in claim 1, wherein the two parallel grooves of the first furniture panel are covered by a seated, second furniture panel.

14. The device as claimed in claim 1, wherein the first furniture panel has a second set of two parallel grooves formed into the first panel side being open to the first panel side and do not penetrate through to the second panel side, and a second set of two exposed busbars laid respectively in the second set of two parallel grooves, wherein the two parallel grooves and the second set of two parallel grooves lead into each other and are at an angle to one another, wherein the two exposed busbars and the second set of two exposed busbars are connected to one another in an electrically conductive manner by an electrically conductive connecting element.

15. The device as claimed in claim 1, wherein the two exposed busbars are clawed in the two parallel grooves.

16. A device for the electrification of furniture, comprising:
    at least a first furniture panel, which has two panel sides being a first panel side opposite a second panel side, wherein in the first panel side, two parallel grooves are formed into the first panel side being open to the first panel side and do not penetrate through to the second panel side, and two exposed busbars are laid respectively in the two parallel grooves; and at least one electric plug configured for connecting to the two exposed busbars, wherein the plug has two electrical contacts, which are formed as exposed collector contacts on a connecting side of a plug housing and as connection contacts on a front side of the plug housing;

wherein the plug is inserted into a bore, wherein the bore is formed into the first panel side being open to the first panel side and does not penetrate through to the second panel side, the bore interrupting the two parallel grooves;

wherein the bore present in the first furniture panel is arranged eccentrically with respect to the two parallel grooves; and wherein the exposed collector contacts each lie against the two exposed busbars in an electrically conductive manner;

wherein the first furniture panel has a second set of two parallel grooves formed into the first panel side being open to the first panel side and do not penetrate through to the second panel side, and a second set of two exposed busbars laid respectively in the second set of two parallel grooves, wherein the two parallel grooves and the second set of two parallel grooves lead into each other and are at an angle to one another, wherein the two exposed busbars and the second set of two exposed busbars are connected to one another in an electrically conductive manner by an electrically conductive connecting element.

* * * * *